(12) United States Patent
Suzuki (10) Patent No.: US 8,740,134 B2
(45) Date of Patent: Jun. 3, 2014

(54) UNMANNED AIRCRAFT SYSTEM AND OPERATION METHOD THEREOF

(75) Inventor: Satoshi Suzuki, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 808 days.

(21) Appl. No.: 12/935,432

(22) PCT Filed: Aug. 13, 2009

(86) PCT No.: PCT/JP2009/064315
§ 371 (c)(1),
(2), (4) Date: Nov. 9, 2010

(87) PCT Pub. No.: WO2010/021295
PCT Pub. Date: Feb. 25, 2010

(65) Prior Publication Data
US 2011/0049288 A1    Mar. 3, 2011

(30) Foreign Application Priority Data
Aug. 21, 2008    (JP) .................................. 2008-212958

(51) Int. Cl.
*B64C 37/02*    (2006.01)
(52) U.S. Cl.
USPC ............. 244/2; 244/63; 244/110 F; 244/75.1; 244/190; 244/194
(58) Field of Classification Search
USPC ..................... 244/2, 63, 110 F, 75.1, 190, 194
See application file for complete search history.

(56) References Cited

U.S. PATENT DOCUMENTS

| | | | | |
|---|---|---|---|---|
| 2,780,422 A | * | 2/1957 | Maglio, Jr. ........................ | 244/2 |
| 2,843,337 A | * | 7/1958 | Bennett ............................ | 244/2 |
| 2,876,677 A | * | 3/1959 | Clark et al. ..................... | 89/1.51 |
| 5,499,784 A | * | 3/1996 | Crabere et al. ............ | 244/135 A |
| 6,068,211 A | | 5/2000 | Toliver et al. | |
| 6,540,179 B2 | | 4/2003 | Henderson | |
| 6,641,082 B2 | | 11/2003 | Bevilaqua et al. | |
| 6,869,042 B2 | | 3/2005 | Harrison | |

(Continued)

FOREIGN PATENT DOCUMENTS

| | | |
|---|---|---|
| JP | 2785778 | 5/1997 |
| JP | 2006-197068 | 7/2006 |

OTHER PUBLICATIONS

International Search Report issued Sep. 15, 2009 in International (PCT) Application No. PCT/JP2009/064315.

(Continued)

*Primary Examiner* — J. Woodrow Eldred
(74) *Attorney, Agent, or Firm* — Wenderoth, Lind & Ponack, L.L.P.

(57) ABSTRACT

An unmanned aircraft system includes a manned aircraft and an unmanned aircraft. The manned aircraft includes a manned aircraft main wing, a manned aircraft fuselage, a manned aircraft landing system, and a manned aircraft joining mechanism provided at a bottom portion of the manned aircraft fuselage. The unmanned aircraft includes an unmanned aircraft main wing, an unmanned aircraft fuselage, an unmanned aircraft landing system, and an unmanned aircraft joining mechanism provided at a roof portion of the unmanned aircraft fuselage. The manned aircraft joining mechanism and the unmanned aircraft joining mechanism are detachably joined. The unmanned aircraft system can take off or land in a state that the unmanned aircraft and the manned aircraft are joined.

12 Claims, 7 Drawing Sheets

(56) References Cited

U.S. PATENT DOCUMENTS

| | | |
|---|---|---|
| 2002/0074454 A1 | 6/2002 | Henderson |
| 2003/0183719 A1 | 10/2003 | Bevilaqua et al. |
| 2004/0089767 A1 | 5/2004 | Harrison |
| 2005/0134496 A1 | 6/2005 | Trainor |
| 2009/0294573 A1* | 12/2009 | Wilson et al. .................... 244/2 |
| 2010/0025523 A1* | 2/2010 | Kutzmann et al. ................ 244/2 |

OTHER PUBLICATIONS

Extended European Search Report issued Feb. 3, 2014 in corresponding European Patent Application No. 09808231.6.

* cited by examiner

UNMANNED AIRCRAFT SYSTEM AND OPERATION METHOD THEREOF

TECHNICAL FIELD

The present invention relates to an unmanned aircraft system for joining or separating an unmanned aircraft and a manned aircraft in the air, an unmanned aircraft used in the unmanned aircraft system, a manned aircraft used in the unmanned aircraft system, and an operation method of the unmanned aircraft system.

BACKGROUND ART

Specification of Japanese Patent No. 2785778 discloses an air-to-air missile launching method using a carrier aircraft and a small unmanned platform aircraft. The small unmanned platform aircraft with a missile is separated from the carrier aircraft in the air. The small unmanned platform aircraft automatically turns along a predetermined flight course by using GPS (Global Positioning System) navigation. The small unmanned platform aircraft turns in the air to search and lock on a hostile aircraft. The small unmanned platform aircraft launches the missile to the locked-on hostile aircraft.

According to Specification of U.S. Pat. No. 6,540,179, landing and take-off of an unmanned aircraft presents problems in providing necessary communication links between ground controllers and the unmanned aircraft. Operation of unmanned aircraft from typical airports presents a potential safety problem to other aircraft and populated areas, thereby making conventional unmanned aircraft approaches for cargo shipment unattractive. Operation of unmanned aircraft from an airport or airbase also requires ground based personnel with special training in take-off, landing and ground support of unmanned aircraft.

Specification of U.S. Pat. No. 6,540,179 discloses an unmanned aircraft system including a support aircraft and an unmanned aircraft. The unmanned aircraft in an inverted position and the support aircraft are docked during flight so that a cargo bay of the unmanned aircraft faces a cargo bay of the support aircraft. The cargo bay of the unmanned aircraft is located on a bottom of the fuselage of the unmanned aircraft. The cargo bay of the support aircraft is located on a bottom of the fuselage of the support aircraft. The support aircraft loads cargoes to the unmanned aircraft. After that, the support aircraft and the unmanned aircraft are separated to flight independently.

Figure 1:
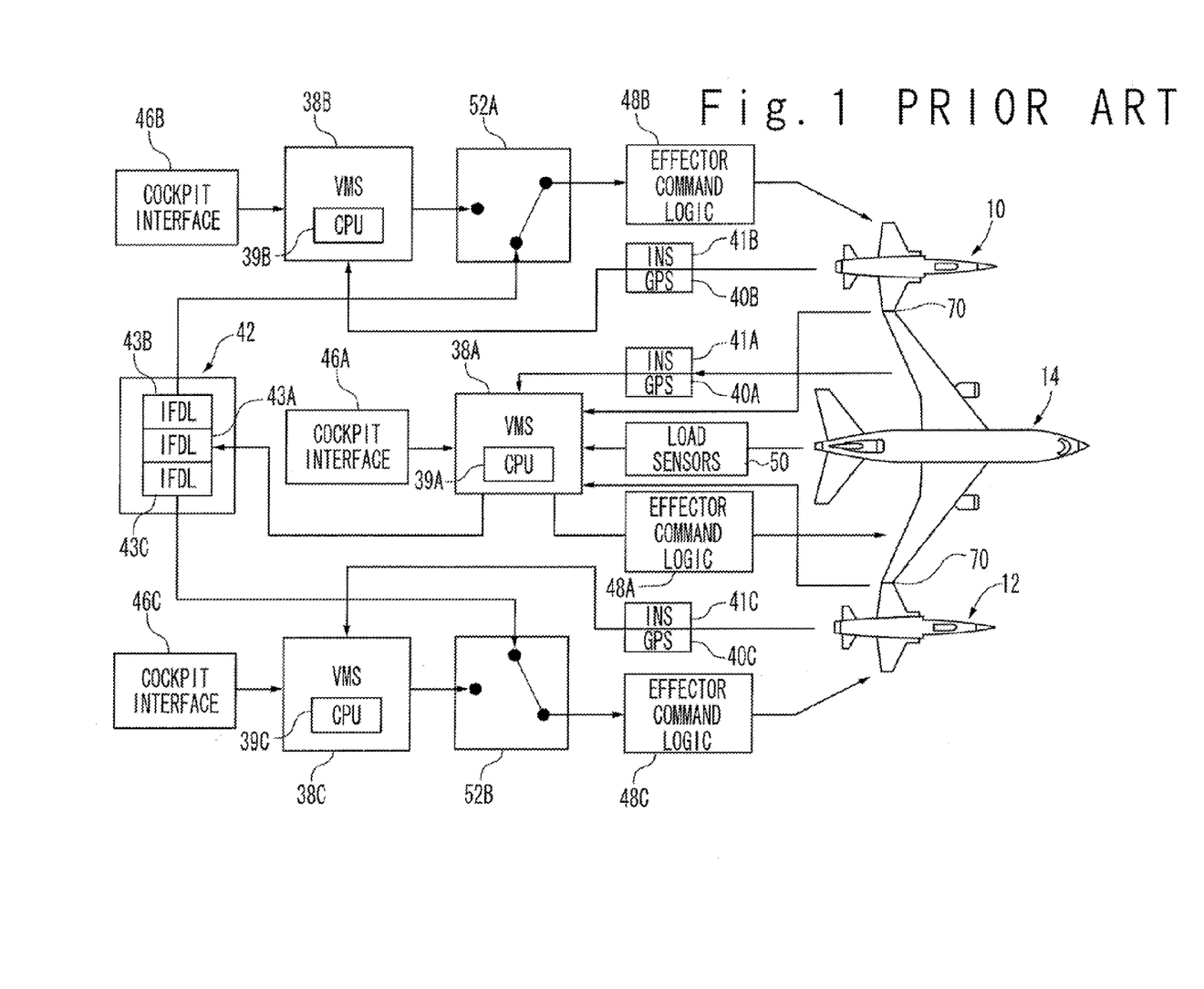
FIG. 1 is a schematic diagram of a conventional flight control system for three aircrafts.

Specification of U.S. Pat. No. 6,641,082 discloses an aircraft ferrying system. Referring to FIG. 1, a flight control system of the aircraft ferrying system will be explained. The aircraft ferrying system includes a large ferrying aircraft 14 and small ferried aircrafts 10 and 12 joined to the ferrying aircraft 14 at the wing-tips. The aircrafts 14, 10, and 12 incorporate VMS (Vehicle Management Systems) 38A to 38C, respectively. The VMS 38A to 38C include CPUs (Central Processing Units) 39A to 39C, respectively. The aircrafts 14, 10, and 12 incorporate GPS (Global Positioning System) 40A to 40C and INSs (In-Flight Navigation Systems) 41A to 41C, all coupled to the CPUs 39A to 39C, respectively. A communication link 42 is used to communicate between the aircrafts 14, 10, and 12. The communication link 42 is IFDL (In Flight Data Link) 43A to 43C which include antennas (not shown).

The aircrafts 14, 10, and 12 include cockpit interfaces 46A to 46C that transfer pilot inputs to the corresponding VMS. VMS inputs are provided to effector command logic circuits 48A to 48C, respectively. The effector command logic circuits 48A to 48C send commands to effectors (a ladder, a flap, and the like) of the air crafts 14, 10, and 12, respectively. The cargo aircraft 14 includes a load sensor 50 distributed within wings. The load sensor 50 measures loads on the ferrying aircraft 14, and provides an input to the CPU 39A. When the ferried aircraft 10 is joined to the ferrying aircraft 14, a switch 52A located between the VMS 38B and the effector command logic circuit 48B disconnects the VMS 38B and couples the effector command logic circuit 48B to the IFDL 43B. When the ferried aircraft 12 is joined to the ferrying aircraft 14, a switch 52B located between the VMS 38C and the effector command logic circuit 48C disconnects the VMS 38C and couples the effector command logic circuit 48C to the IFDL 43C. The VMS 38A incorporates a plurality of control system programs. A first program is used when an aircraft is joined to a right wing of the ferrying aircraft 14, a second program is used when an aircraft is joined to a left wing of the ferrying aircraft 14, a third program is used when aircrafts are joined to both wings of the ferrying aircraft 14, and a fourth program is used when no aircraft is joined to the ferrying aircraft 14. A sensor 70 sends to the VMS 38A, a signal indicating that the ferried aircrafts 10 and 14 are joined to the wings of the ferrying aircraft 14, and the CPU 39A selects the program.

When the aircrafts 14, 10, and 12 are connected, the load sensor 50 determines if loads on the aircraft 14 during flight are becoming excessive. If they are, the CPU 39A sends signals to the effector command logic circuit 48A, which will actuate the appropriate effectors on the aircraft 14 to dampen them out. The CPU 39A sends signals to aircraft 10 or 12 or both via the IFDL 43A causing the effector logic circuits 48B and 48C to actuate the appropriate effector (rudder, aileron or elevator, etc) to also damp out the aerodynamic loads being introduced into the aircraft 14.

Specification of U.S. Pat. No. 6,869,042 discloses a system including a larger carrier aircraft and a UAV (Unmanned Aerial Vehicle). The UAV is detachably connected to a lower side of a wing of the larger carrier aircraft.

CITATION LIST

Patent Literature

Patent literature 1: Specification of Japanese Patent No. 2785778
Patent literature 2: Specification of U.S. Pat. No. 6,540,179
Patent literature 3: Specification of U.S. Pat. No. 6,641,082
Patent literature 4: Specification of U.S. Pat. No. 6,869,042

SUMMARY OF INVENTION

An object of the present invention is to provide an unmanned aircraft system capable of taking off or landing in a state that an unmanned aircraft and a manned aircraft are joined, an unmanned aircraft used in the unmanned aircraft system, a manned aircraft used in the unmanned aircraft system, and an operation method of the unmanned aircraft system.

In a first aspect of the present invention, an unmanned aircraft system includes a manned aircraft and an unmanned aircraft. The manned aircraft includes a manned aircraft main wing, a manned aircraft fuselage, a manned aircraft landing system, and a manned aircraft joining mechanism provided at a bottom portion of the manned aircraft fuselage. The unmanned aircraft includes an unmanned aircraft main wing, an unmanned aircraft fuselage, an unmanned aircraft landing system, and an unmanned aircraft joining mechanism provided at a roof portion of the unmanned aircraft fuselage. The manned aircraft joining mechanism and the unmanned aircraft joining mechanism are configured to be detachably joined.

The manned aircraft joining mechanism is preferred to include a first joining rod, a second joining rod, a first actuator, a second actuator, and a manned aircraft contact portion. The unmanned aircraft joining mechanism is preferred to include a first joining hole portion in which a first joining hole is formed, a second joining hole portion in which a second joining hole is formed, a first locking portion, a second locking portion, and an unmanned aircraft contact portion. The first actuator is configured to move the first joining rod in a first direction to insert the first joining rod into the first joining hole. The second actuator is configured to move the second joining rod in the first direction to insert the second joining rod into the second joining hole. The first locking portion is configured to lock the first joining rod such that the first joining rod is not pulled out from the first joining hole. The second locking portion is configured to lock the second joining rod such that the second joining rod is not pulled out from the second joining hole. The first actuator and the second actuator are configured to move the first joining rod and the second joining rod in a direction opposite to the first direction to cause the first contact portion to contact the second contact portion.

The manned aircraft is preferred to include a piloting interface operated by a pilot. The unmanned aircraft is preferred to include an unmanned aircraft flight sensor, an unmanned aircraft control surface system, and an unmanned aircraft propulsion system. When the manned aircraft and unmanned aircraft are joined, the piloting interface generates an joined-case pilot command signal, the unmanned aircraft flight sensor generates an unmanned aircraft joined-case flight state signal indicating a flight state of the unmanned aircraft, and the unmanned aircraft control surface system or the unmanned aircraft propulsion system operate based on the joined-case pilot command signal and the unmanned aircraft joined-case flight state signal.

The piloting interface is preferred to generate a landing system control pilot command signal. When the manned aircraft and the unmanned aircraft are separated, the manned aircraft landing system operates based on the landing system control pilot command signal, and the unmanned aircraft landing system does not operate based on the landing system control pilot command. When the manned aircraft and the unmanned aircraft are joined, the manned aircraft landing system does not operate based on the landing system control pilot command signal, and the unmanned aircraft landing system operates based on the landing system control pilot command.

The manned aircraft is preferred to include a manned aircraft flight sensor, a manned aircraft flight control computer, a manned aircraft control surface system, and a manned aircraft propulsion system. The unmanned aircraft is preferred to include an unmanned aircraft flight control computer. When the manned aircraft and the unmanned aircraft are separated, the piloting interface generates a separated-case pilot command signal, the manned aircraft flight sensor generates a manned aircraft separated-case flight state signal indicating a flight state of the manned aircraft, the manned aircraft flight control computer generates a manned aircraft separated-case flight control signal based on the separated-case pilot command signal, the manned aircraft separated-case flight state signal, and a manned aircraft separated-case flight control rule, the manned aircraft control surface system or the manned aircraft propulsion system operates based on the manned aircraft separated-case flight control signal, the unmanned aircraft flight sensor generates an unmanned aircraft separated-case flight state signal indicating a flight state of the unmanned aircraft, the unmanned aircraft flight control computer generates an unmanned aircraft separated-case flight control signal based on a flight plan signal, the unmanned aircraft separated-case flight state signal, and an unmanned aircraft separated-case flight control rule, and the unmanned aircraft control surface system or the unmanned aircraft propulsion system operate based on the unmanned aircraft separated-case flight control signal. When the manned aircraft and the unmanned aircraft are joined, the manned aircraft flight sensor generates a manned aircraft joined-case flight state signal indicating a flight state of the manned aircraft, the manned aircraft flight control computer generates a manned aircraft joined-case flight control signal based on the joined-case pilot command signal, the manned aircraft joined-case flight state signal, and a manned aircraft joined-case flight control rule, the manned aircraft control surface system or the manned aircraft propulsion system operates based on the manned aircraft joined-case flight control signal, the unmanned aircraft flight control computer generates an unmanned aircraft joined-case flight control signal based on the manned aircraft joined-case flight control signal, the unmanned aircraft joined-case flight control state signal, and an unmanned aircraft joined-case flight control rule, and the unmanned aircraft control surface system or the unmanned aircraft propulsion system operates based on the unmanned aircraft joined-case flight control signal.

The manned aircraft is preferred to include a manned aircraft flight sensor, a manned aircraft flight control computer, a manned aircraft control surface system, and a manned aircraft propulsion system. The unmanned aircraft is preferred to include an unmanned aircraft flight control computer. When the manned aircraft and the unmanned aircraft are separated, the piloting interface generates an separated-case pilot command signal, the manned aircraft flight sensor generates a manned aircraft separated-case flight state signal indicating a flight state of the manned aircraft, the manned aircraft flight control computer generates a manned aircraft separated-case flight control signal based on the separated-case pilot command signal, the manned aircraft separated-case flight state signal, and a manned aircraft separated-case flight control rule, the manned aircraft control surface system or the manned aircraft propulsion system operates based on the manned aircraft separated-case flight control signal, the unmanned aircraft flight sensor generates an unmanned aircraft separated-case flight state signal indicating a flight state of the unmanned aircraft, the unmanned aircraft flight control computer generates an unmanned aircraft separated-case flight control signal based on a flight plan signal, the unmanned aircraft separated-case flight state signal, and an unmanned aircraft separated-case flight control rule, and the unmanned aircraft control surface system or the unmanned aircraft propulsion system operate based on the unmanned aircraft separated-case flight control signal. When the manned aircraft and the unmanned aircraft are joined, the manned aircraft flight sensor generates a manned aircraft joined-case flight state signal indicating a flight state of the manned aircraft, the manned aircraft flight control computer generates a manned aircraft joined-case flight control signal based on the joined-case pilot command signal, the manned aircraft joined-case flight state signal, the unmanned aircraft joined-case flight state signal, and a manned aircraft joined-case flight control rule, the manned aircraft control surface system or the manned aircraft propulsion system operates based on the manned aircraft joined-case flight control signal, the unmanned aircraft flight control computer generates an unmanned aircraft joined-case flight control signal based on the manned aircraft joined-case flight control signal and an unmanned aircraft joined-case flight control rule, and the unmanned aircraft control surface system or the unmanned aircraft propulsion system operates based on the unmanned aircraft joined-case flight control signal.

The manned aircraft is preferred to include a manned aircraft signal conversion device and an optical signal emission surface positioned at a tip of the first joining rod. The unmanned aircraft is preferred to include an unmanned aircraft signal conversion device and an optical signal incident surface positioned at a bottom of the first joining hole. The manned aircraft joined-case flight control signal is generated as a first electric signal. The manned aircraft signal conversion device converts the first electric signal into an optical signal. The optical signal is emitted from the optical signal emission surface and enters the optical signal incident surface. The unmanned aircraft signal conversion device converts the optical signal into a second electric signal. The unmanned aircraft flight control computer generates the unmanned aircraft separated-case flight control signal based on the second electric signal.

It is preferred that the first locking portion is configured to mechanically lock the first joining rod and the second locking portion is configured to mechanically lock the second joining rod.

It is preferred that the first locking portion is configured to electromagnetically lock the first joining rod and the second locking portion is configured to electromagnetically lock the second joining rod.

The manned aircraft preferred to include a camera provided at the bottom portion and a display device provided in a cockpit. The display device displays images taken by the camera.

The manned aircraft is preferred to include a piloting interface configured to generate a landing system control pilot command signal based on an operation by a pilot. When the manned aircraft and the unmanned aircraft are joined, the unmanned aircraft landing system operates based on the landing system control pilot command signal.

In a second aspect of the present invention, there is provided an unmanned aircraft used in the above unmanned aircraft system.

In a third aspect of the present invention, there is provided a manned aircraft used in the above unmanned aircraft system.

In a fourth aspect of the present invention, an operation method of an unmanned aircraft system include a step of taking off in a joined state of a manned aircraft and an unmanned aircraft and a step of separating the manned aircraft and the unmanned aircraft in air. The manned aircraft includes a manned aircraft main wing, a manned aircraft fuselage, a manned aircraft landing system, and a manned aircraft joining mechanism provided at a bottom portion of the manned aircraft fuselage. The unmanned aircraft includes an unmanned aircraft main wing, an unmanned aircraft fuselage, an unmanned aircraft landing system, and an unmanned aircraft joining mechanism provided at a roof portion of the unmanned aircraft fuselage. In the step of taking off, the manned aircraft joining mechanism and the unmanned aircraft joining mechanism are in a joined state and the unmanned aircraft landing system is used. In the step of separating, the manned aircraft joining mechanism and the unmanned aircraft joining mechanism are separated.

In a fifth aspect of the present invention, an operation method of an unmanned aircraft system include a step of joining a manned aircraft and an unmanned aircraft in air and a step of landing in a joined state of the manned aircraft and the unmanned aircraft. The manned aircraft includes a manned aircraft main wing, a manned aircraft fuselage, a manned aircraft landing system, and a manned aircraft joining mechanism provided at a bottom portion of the manned aircraft fuselage. The unmanned aircraft includes an unmanned aircraft main wing, an unmanned aircraft fuselage, an unmanned aircraft landing system, and an unmanned aircraft joining mechanism provided at a roof portion of the unmanned aircraft fuselage. In the step of joining, the manned aircraft joining mechanism and the unmanned aircraft joining mechanism are joined. In the step of landing, the manned aircraft joining mechanism and the unmanned aircraft joining mechanism are in a joined state and the unmanned aircraft landing system is used.

According to the present invention, an unmanned aircraft system capable of taking off or landing in a state that an unmanned aircraft and a manned aircraft are joined, an unmanned aircraft used in the unmanned aircraft system, a manned aircraft used in the unmanned aircraft system, and an operation method of the unmanned aircraft system are provided.

BRIEF DESCRIPTION OF DRAWINGS

The above and other objects, advantages, and features of the present invention will be more apparent from the description of embodiments taken in conjunction with the accompanying drawings, in which.

DESCRIPTION OF EMBODIMENTS

Referring to attached drawings, embodiments of an unmanned aircraft system, an unmanned aircraft, a manned aircraft, and an operation method of the unmanned aircraft system according to the present invention will be described below.

First Embodiment

Figure 2:
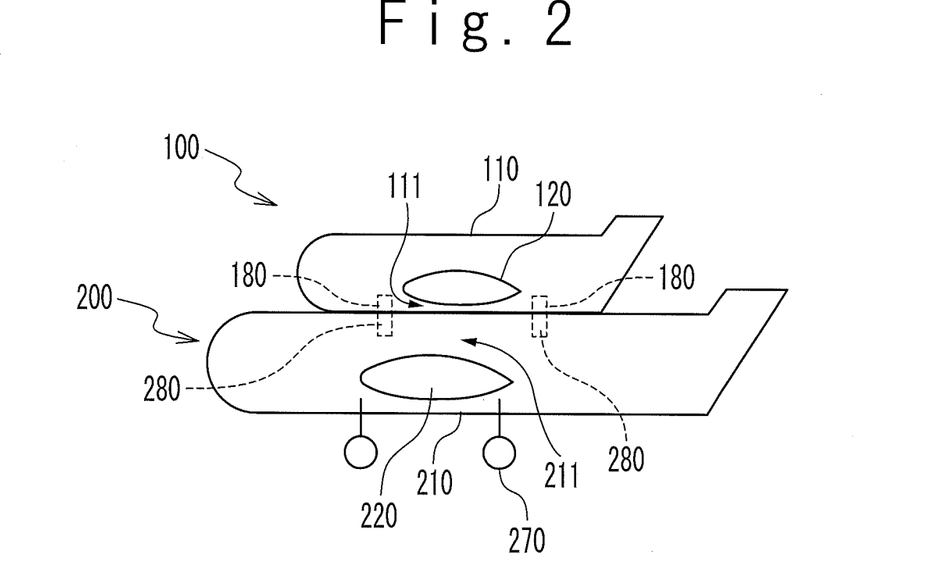
FIG. 2 shows a manned aircraft and an unmanned aircraft according to a first embodiment of the present invention in a joined state.

As shown in FIG. 2, an unmanned aircraft system according to a first embodiment of the present invention includes a manned aircraft 100 and an unmanned aircraft 200. The manned aircraft 100 includes a fuselage 110, a main wing 120, joining mechanisms 180 provided at a bottom portion 111 of the fuselage 110, and a landing system. In FIG. 2, the landing system of the manned aircraft 100 is housed in the fuselage 110 or the main wing 120. The joining mechanisms 180 include a joining mechanism 180 on a nose side and a joining mechanism 180 on a tail side. The unmanned aircraft 200 includes a fuselage 210, a main wing 220, joining mechanisms 280 provided at a roof portion 211 of the fuselage 210, and a landing system 270. The joining mechanisms 280 include a joining mechanism 280 on a nose side and a joining mechanism 280 on a tail side. When the joining mechanisms 180 and the joining mechanisms 280 are joined to each other, the manned aircraft 100 and the unmanned aircraft 200 form an airframe (a manned aircraft) piloted by a pilot boarding the manned aircraft 100. In the taking off and landing of the manned aircraft 100 and the unmanned aircraft 200 in the joined state, the landing system 270 is used and the landing system of the manned aircraft 100 is not used.

Figure 3:
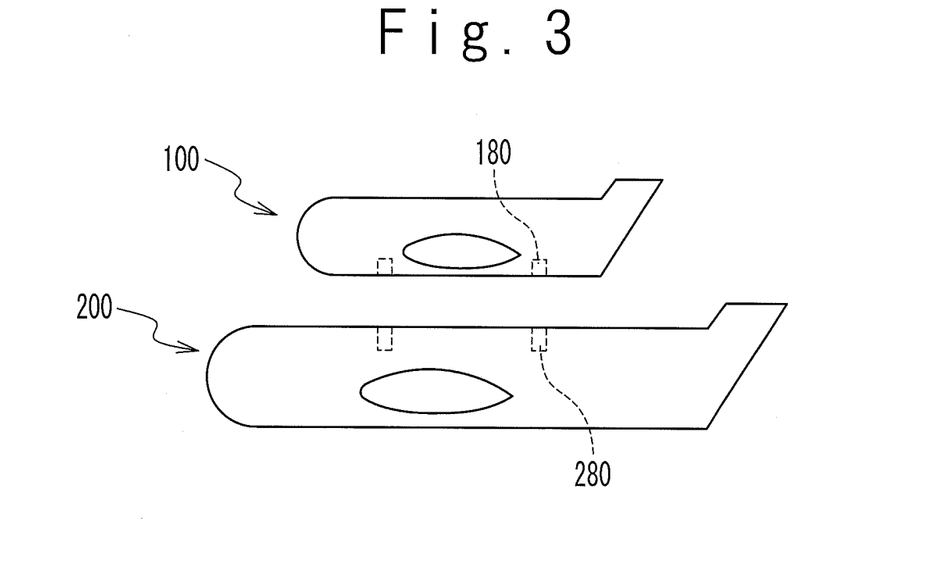
FIG. 3 shows the manned aircraft and the unmanned aircraft in a separated state.

As shown in FIG. 3, the joining mechanisms 180 and the joining mechanisms 280 are separated, and accordingly in a case that the manned aircraft 100 and the unmanned aircraft 200 are separated, the manned aircraft 100 and the unmanned aircraft 200 can independently fly, respectively.

An example of an operation method of the unmanned aircraft system according to the present embodiment will be described below. In this example, a flight of unmanned aircraft is prohibited in air area above an aerodrome used by the unmanned aircraft system according to the present embodiment.

The manned aircraft 100 and the unmanned aircraft 200 take off from the aerodrome in a state that they are joined to each other. The manned aircraft 100 and the unmanned aircraft 200 fly in the joined state to leave the air area in which the flight of unmanned aircraft is prohibited. Outside the air area in which the flight of unmanned aircraft is prohibited, the manned aircraft 100 and the unmanned aircraft 200 are separated in the air (during flight) by separating the joining mechanisms 180 and the joining mechanisms 280.

After the separation, the unmanned aircraft 200 carries out a mission. The unmanned aircraft 200 is able to carry out a long-time mission beyond a physiological limit of a human. The manned aircraft 100 waits at the aerodrome or in the air until the unmanned aircraft 200 completes the mission.

After the completion of mission of the unmanned aircraft 200, the manned aircraft 100 and the unmanned aircraft 200 respectively fly toward a meeting point in the outside of the air area in which the flight of unmanned aircraft is prohibited. After the meeting, the manned aircraft 100 and the unmanned aircraft 200 are joined in the air (during flight) by joining the joining mechanisms 180 and the joining mechanisms 280.

The manned aircraft 100 and the unmanned aircraft 200 fly to and land on the aerodrome in the state that they are joined to each other.

Since the joined manned aircraft 100 and unmanned aircraft 200 form the manned aircraft piloted by the pilot boarding the manned aircraft 100, the joined manned aircraft 100 and the unmanned aircraft 200 can fly even in the air area in which the flight of unmanned aircraft is prohibited. In addition, an air traffic controller of the aerodrome can guide the airframe formed by the joined manned aircraft 100 and unmanned aircraft 200 by issuing an instruction to the pilot of the manned aircraft 100.

Moreover, since the landing system 270 is used in the taking off and the landing when the manned aircraft 100 and the unmanned aircraft 200 are joined, the taking off and the landing are possible even when the unmanned aircraft 200 is much larger than the manned aircraft 100.

Figure 4A:
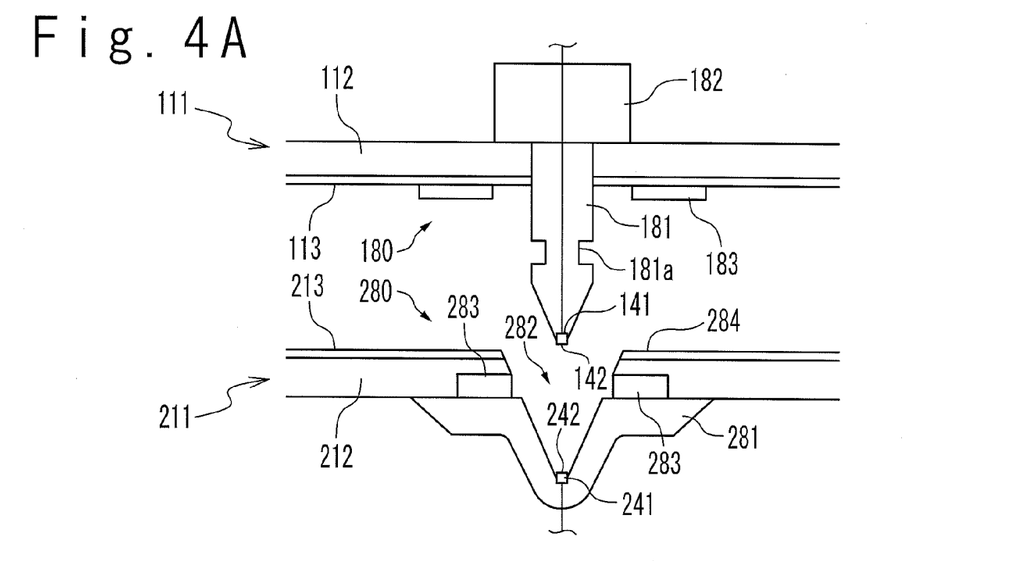
FIG. 4A shows joining mechanisms of the manned aircraft and the unmanned aircraft.

Referring to FIG. 4A, the bottom portion 111 includes a frame 112 and a skin 113 supported by the frame 112. Each joining mechanism 180 includes an actuator 182 supported by the frame 112, a joining rod 181 driven by the actuator 182, and a pad 183 provided on the skin 113. The pad 183 may be referred to as a contact portion. A recessed portion 181a is formed in the joining rod 181. A signal conversion device 141 converts an electric signal into an optical signal which is emitted from a surface 142, or converts an optical signal which has been entered the surface 142 into an electric signal. The surface 142 is positioned at a tip of the joining rod 181. The signal conversion device 141 is arranged in the joining rod 181 or in the fuselage 110. When the signal conversion device 141 is not arranged at the tip of the joining rod 181, the signal conversion device 141 and the surface 142 are connected via an optical fiber.

Referring to FIG. 4A, the roof portion 211 includes a frame 212 and a skin 213 supported by the frame 212. Each joining mechanism 280 includes a joining hole portion 281 supported by the frame 212, a pair of locking portions 283, and a contact portion 284 as a portion of the surface of the skin 213. A joining hole 282 is formed in the joining hole portion 281. A signal conversion device 241 converts an optical signal which has been entered a surface 242 into an electric signal, or converts an electric signal into an optical signal which is emitted from the surface 242. The surface 242 is positioned at the bottom of the joining hole 282. The signal conversion device 241 is arranged in the joining hole portion 281 or in the fuselage 210. When the signal conversion device 241 is not arranged at the bottom of the joining hole 282, the signal conversion device 241 and the surface 242 are connected via an optical fiber.

Figure 4B:
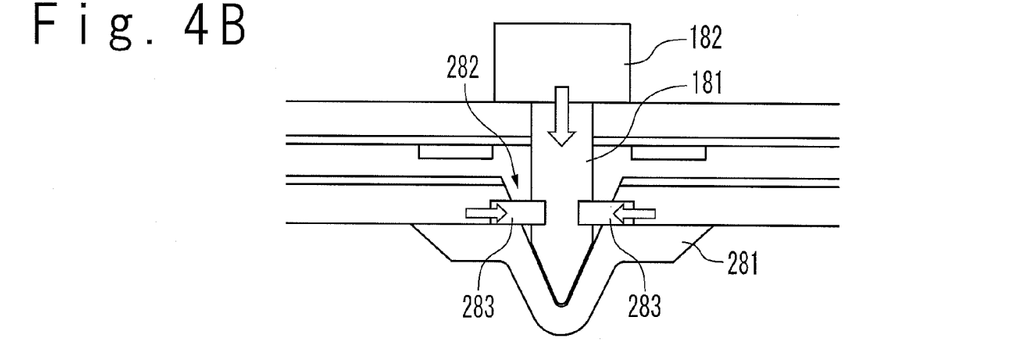
FIG. 4B shows the joining mechanisms of the manned aircraft and the unmanned aircraft.
Figure 4C:
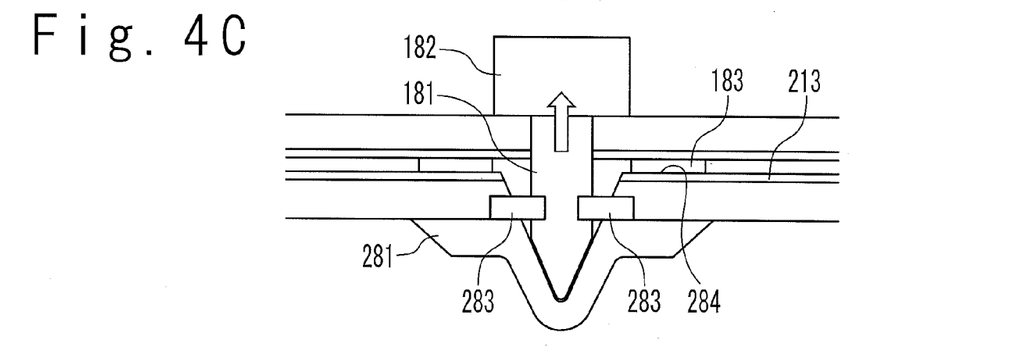
FIG. 4C shows the joining mechanisms of the manned aircraft and the unmanned aircraft.

An operation of the joining mechanisms 180 and 280 at the joining will be described.

Referring to FIG. 4B, the actuator 282 moves the joining rod 181 in a first direction to insert the rod into the joining hole 282. When the joining rod 181 has been inserted into the joining hole 282, the pair of the locking portions 283 are inserted into the recessed portion 181a such that the joining rod is arranged between the locking portions 283, and thereby mechanically lock the joining rod 181 such that the joining rod 181 is not pulled out from the joining hole 282. The surface 142 and the surface 242 face each other in a state that the joining rod 181 is locked. It should be noted that the locking portions 283 may electromagnetically lock the joining rod 181.

Referring to FIG. 4C, when the joining rod 181 has been locked, the actuator 182 moves the joining rod 181 in a second direction opposite to the first direction. Consequently, the bottom portion 111 and the roof portion 211 approach each other, and the pad 183 contacts the contact portion 284. The actuator 182 continues to press the pad 183 and the contact portion 284 with each other by continuing to apply a force in the second direction to the joining rod 181.

In this manner, the manned aircraft 100 and the unmanned aircraft 200 are rigidly joined. The inserting and the locking of the joining rod 181 may be carried out at different timings between the nose side and the tail side; however, it is preferred to carry out the inserting and the locking at the same timing. The moving of the joining rod 181 in the second direction to contact the pad 183 and the contact portion 284 with each other is simultaneously carried out between the nose side and the tail side.

An operation of the joining mechanisms 180 and the joining mechanisms 280 at the separation (release of join) will be described.

The actuator 182 moves the joining rod 181 in the first direction to make the bottom portion 111 and the roof portion 211 apart. After that, when the pair of locking portions 283 are pulled out from the recessed portion 181a to release the lock of the joining rod 181, the manned aircraft 100 and the unmanned aircraft 200 are separated. Here, it is preferred that the joining rod 181 moves in the first direction at the same timing and the lock of the joining rod 181 is released at the same timing between the nose side and the tail side. After the manned aircraft 100 and the unmanned aircraft 200 are separated, it is preferred that the actuator 182 moves the joining rod 181 in the second direction to retract the rod in the fuselage 110.

Figure 5:
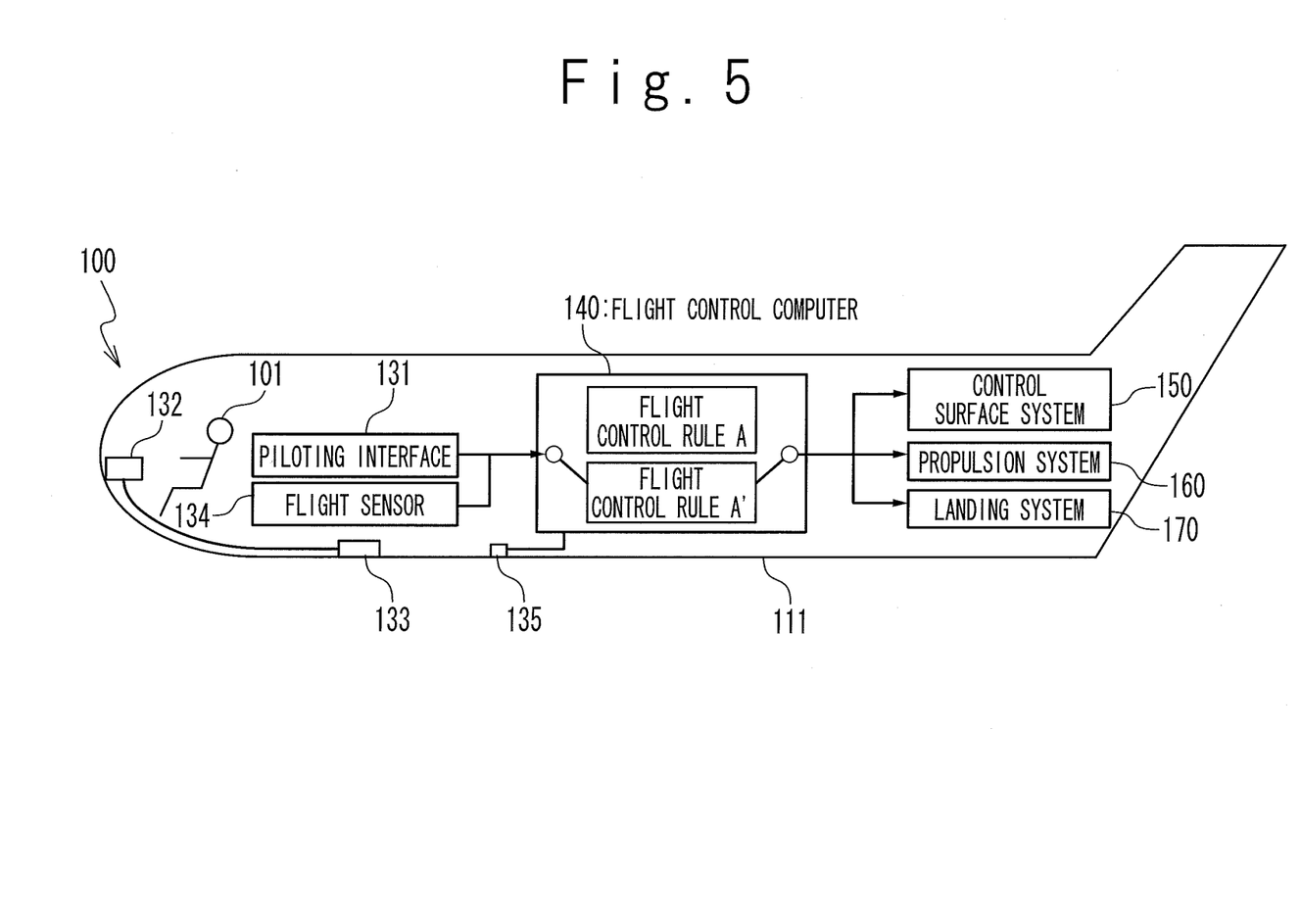
FIG. 5 is a schematic diagram of a flight control system of the manned aircraft in the separated state.

Referring to FIG. 5, a flight control system of the manned aircraft 100 will be described. The manned aircraft 100 includes a cockpit 130 in which the pilot 101 boards, a piloting interface 131 and a display device 132 provided in the cockpit 130, a camera 133 and a join sensor 135 provided at the bottom portion 111, a flight sensor 134, a flight control computer 140, a control surface system 150, a propulsion system 160, and a landing system 170. The piloting interface 131 includes a control stick, a throttle, a landing system control switch, and a joining mechanism control switch, which are operated by the pilot 101. The flight sensor 134 includes a GPS (Global Positioning System) receiver and an inertial navigation system. The flight control computer 140 stores flight control rules A and A' as computer programs in a storage unit. The control surface system 150 includes an aileron, an elevator, a ladder, and a flap. The propulsion system 160 includes an engine. The landing system 170 includes a wheel and a leg. The display device 132 displays images taken by the camera 133. The join sensor 135 detects the join and the separation between the manned aircraft 100 and the unmanned aircraft 200, for example, by sending and receiving a signal to and from a join sensor 235 which is described later. The flight control computer 140 selects the flight control rule A as the program to be used for the flight control when the join sensor 135 detects the separation between the manned aircraft 100 and the unmanned aircraft 200, and selects the flight control rule A' as the program to be used for the flight control when the join sensor 135 detects the join between the manned aircraft 100 and the unmanned aircraft 200. The flight control rule A is adapted to aerodynamic parameters and the like in a case of solo flight of the manned aircraft 100. The flight control rule A' is adapted to aerodynamic parameters and the like in a case of the joined manned aircraft 100 and unmanned aircraft 200.

The flight control of the manned aircraft 100 in the case that the manned aircraft 100 and the unmanned aircraft 200 are separated will be described. The piloting interface 131 generates a separated-case pilot command signal in response to an operation by the pilot 101. The flight sensor 134 generates a manned aircraft separated-case flight state signal indicating a flight state of the manned aircraft 100. The flight control computer 140 generates a manned aircraft separated-case flight control signal based on the separated-case pilot command signal, the manned aircraft separated-case flight state signal, and the flight control rule A. The control surface system 150 or the propulsion system 160 operates based on the manned aircraft separated-case flight control signal. In addition, the landing system 170 operates based on a landing system control pilot command signal which is generated by the piloting interface 131 in response to an operation by the pilot 101.

Figure 6:
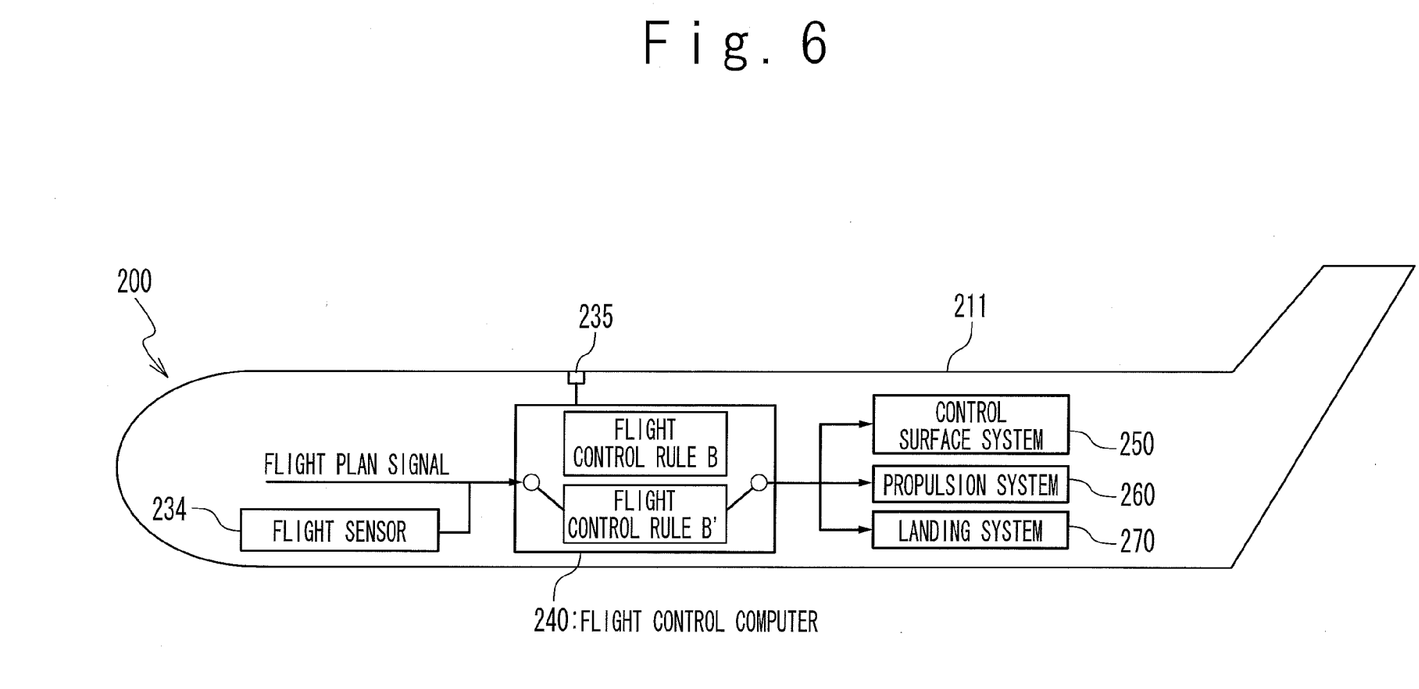
FIG. 6 is a schematic diagram of a flight control system of the unmanned aircraft in the separated state.

Referring to FIG. 6, a flight control system of the unmanned aircraft 200 will be described. The unmanned aircraft 200 includes a flight sensor 234, the join sensor 235 provided at the roof portion 211, a flight control computer 240, a control surface system 250, a propulsion system 260, and the landing system 270. The flight sensor 234 includes a GPS and an inertial navigation system. The flight control computer 240 stores flight control rules B and B' as computer programs in a storage unit. The control surface system 250 includes an aileron, an elevator, a ladder, and a flap. The propulsion system 260 includes an engine. The landing system 270 includes a wheel and a leg. The join sensor 235 detects the join and the separation between the manned aircraft 100 and the unmanned aircraft 200, for example, by sending and receiving a signal to and from the join sensor 135. The flight control computer 240 selects the flight control rule B as the program to be used for the flight control when the join sensor 235 detects the separation between the manned aircraft 100 and the unmanned aircraft 200, and selects the flight control rule B' as the program to be used for the flight control when the join sensor 235 detects the join between the manned aircraft 100 and the unmanned aircraft 200. The flight control rule B is adapted to aerodynamic parameters and the like in a case of solo flight of the unmanned aircraft 200. The flight control rule B' is adapted to aerodynamic parameters and the like in a case of the joined manned aircraft 100 and unmanned aircraft 200.

The flight control of the unmanned aircraft 200 in the case that the manned aircraft 100 and the unmanned aircraft 200 are separated will be described. The flight sensor 234 generates an unmanned aircraft separated-case flight state signal indicating a flight state of the unmanned aircraft 200. The flight control computer 240 generates an unmanned aircraft separated-case flight control signal based on a flight plan signal, the unmanned aircraft separated-case flight state signal, and the flight control rule B. The flight plan signal is generated in the unmanned aircraft 200 based on flight plan data, or is provided from a remote control device via wireless communication. The control surface system 250 or the propulsion system 260 operates based on the unmanned aircraft separated-case flight control signal. In addition, the landing system 270 operates based on the flight plan signal and does not operate based on the landing system control pilot command signal.

The flight control for joining the manned aircraft 100 and the unmanned aircraft 200 will be described. The unmanned aircraft 200 flies in a linear uniform motion in a horizontal plane based on the flight plan signal indicating a linear uniform flight. The manned aircraft 100 flies in parallel with the unmanned aircraft 200 above the unmanned aircraft 200 at the same speed. The pilot 101 carries out the alignment of the joining mechanism 180 and the joining mechanism 280 while watching the image displayed by the display device 132. When the alignment of the joining mechanism 180 and the joining mechanism 280 is completed, the pilot 101 operates the piloting interface 131 to insert the joining rod 181 into the joining hole 282. After that, the pilot 101 operates the piloting interface 131 to move the joining rod 181 in the second direction, and thereby make the pad 183 tightly contact the contact portion 284. It should be noted that the GPS receivers of the flight sensors 134 and 234 may be used to carry out the alignment of the joining mechanism 180 and the joining mechanism 280.

Figure 7:
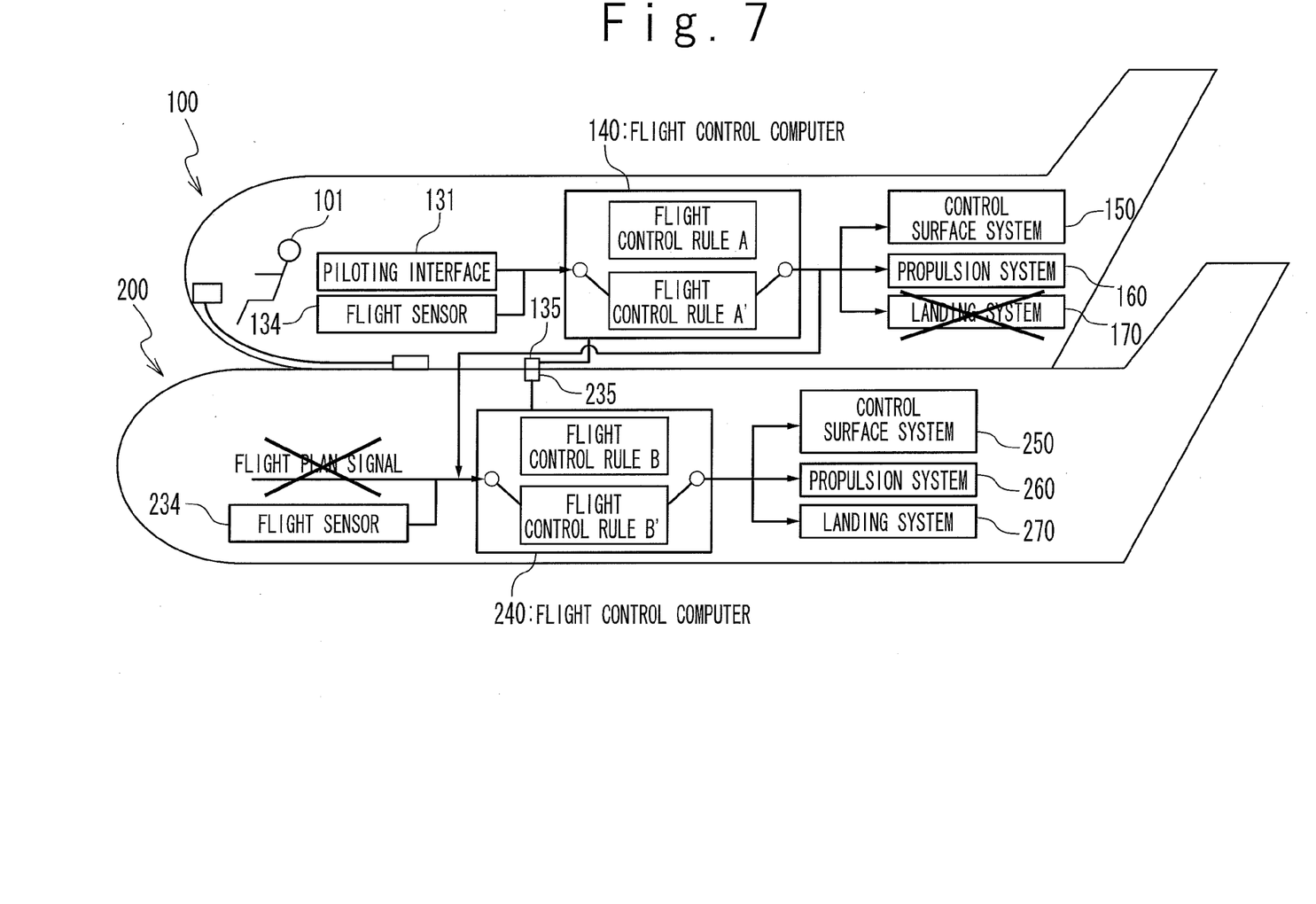
FIG. 7 is a schematic diagram of the flight control systems of the manned aircraft and the unmanned aircraft in the joined state.

Referring to FIG. 7, the flight control in the case that the manned aircraft 100 and the unmanned aircraft 200 are joined will be described. The piloting interface 131 generates a joined-case pilot command signal in response to an operation by the pilot 101. The flight sensor 134 generates a manned aircraft joined-case flight state signal indicating a flight state of the manned aircraft 100. The flight sensor 234 generates an unmanned aircraft joined-case flight state signal indicating a flight state of the unmanned aircraft 200. The flight control computer 140 generates a manned aircraft joined-case flight control signal based on the joined-case pilot command signal, the manned aircraft joined-case flight state signal, and the flight control rule A'. The control surface system 150 or the propulsion system 160 operates based on the manned aircraft joined-case flight control signal. The flight control computer 240 generates an unmanned aircraft joined-case flight control signal based on the manned aircraft joined-case flight control signal, the unmanned aircraft joined-case flight state signal, and the flight control rule B'. The flight control computer 240 generates the unmanned aircraft joined-case flight control signal not based on the flight plan signal. The control surface system 250 or the propulsion system 260 operates based on the unmanned aircraft joined-case flight control signal.

According to the present embodiment, since the unmanned aircraft joined-case flight state signal is used in the flight control of the airframe formed by the joined manned aircraft 100 and unmanned aircraft 200, the flight control of the airframe formed by the joined manned aircraft 100 and unmanned aircraft 200 is excellent. The larger the unmanned aircraft 200 is, the more this advantageous effect is remarkable. In the case that the unmanned aircraft 200 is large, since a center-of-mass position of the airframe formed by the joined manned aircraft 100 and unmanned aircraft 200 is close to a center-of-mass position of the unmanned aircraft 200, a speed and an acceleration indicated by the unmanned aircraft joined-case flight state signal exactly represents the flight state of the airframe formed by the joined manned aircraft 100 and unmanned aircraft 200 in comparison with a speed and an acceleration indicated by the manned aircraft joined-case flight state signal. It should be noted that when the joining between the manned aircraft 100 and the unmanned aircraft 200 is not perfectly rigid, it is effective to use both of the unmanned aircraft joined-case flight state signal and the manned aircraft joined-case flight state signal in the flight control of the airframe formed by the joined manned aircraft 100 and unmanned aircraft 200.

In the case that the manned aircraft 100 and the unmanned aircraft 200 are joined, the landing system 170 does not operate based on a landing system control pilot command signal generated by the piloting interface 131 in response to an operation by the pilot 101, and the landing system 270 operates based on the landing system control pilot command signal. The landing system 270 operates not based on the flight plan signal.

The transmission of the manned aircraft joined-case flight control signal from the flight control computer 140 to the flight control computer 240 will be described. The manned aircraft joined-case flight control signal is generated as a first electric signal. The signal conversion device 141 converts the first electric signal into a first optical signal. The first optical signal is emitted from the surface 142 and enters the surface 242. The signal conversion device 241 converts the first optical signal into a second electric signal. The flight control computer 240 generates the unmanned aircraft joined-case flight control signal based on the second electric signal.

The flight control for separating the manned aircraft 100 and the unmanned aircraft 200 will be described. The airframe formed by the joined manned aircraft 100 and unmanned aircraft 200 flies in a linear uniform motion in a horizontal plane. The pilot 101 operates the piloting interface 131 to move the joining rod 181 in the first direction, and thereby makes the bottom portion 111 and the roof portion 211 apart. After that, the locking portions 283 release the lock of the joining rod 181, and thereby the manned aircraft 100 and the unmanned aircraft 200 are separated.

Second Embodiment

Figure 8:
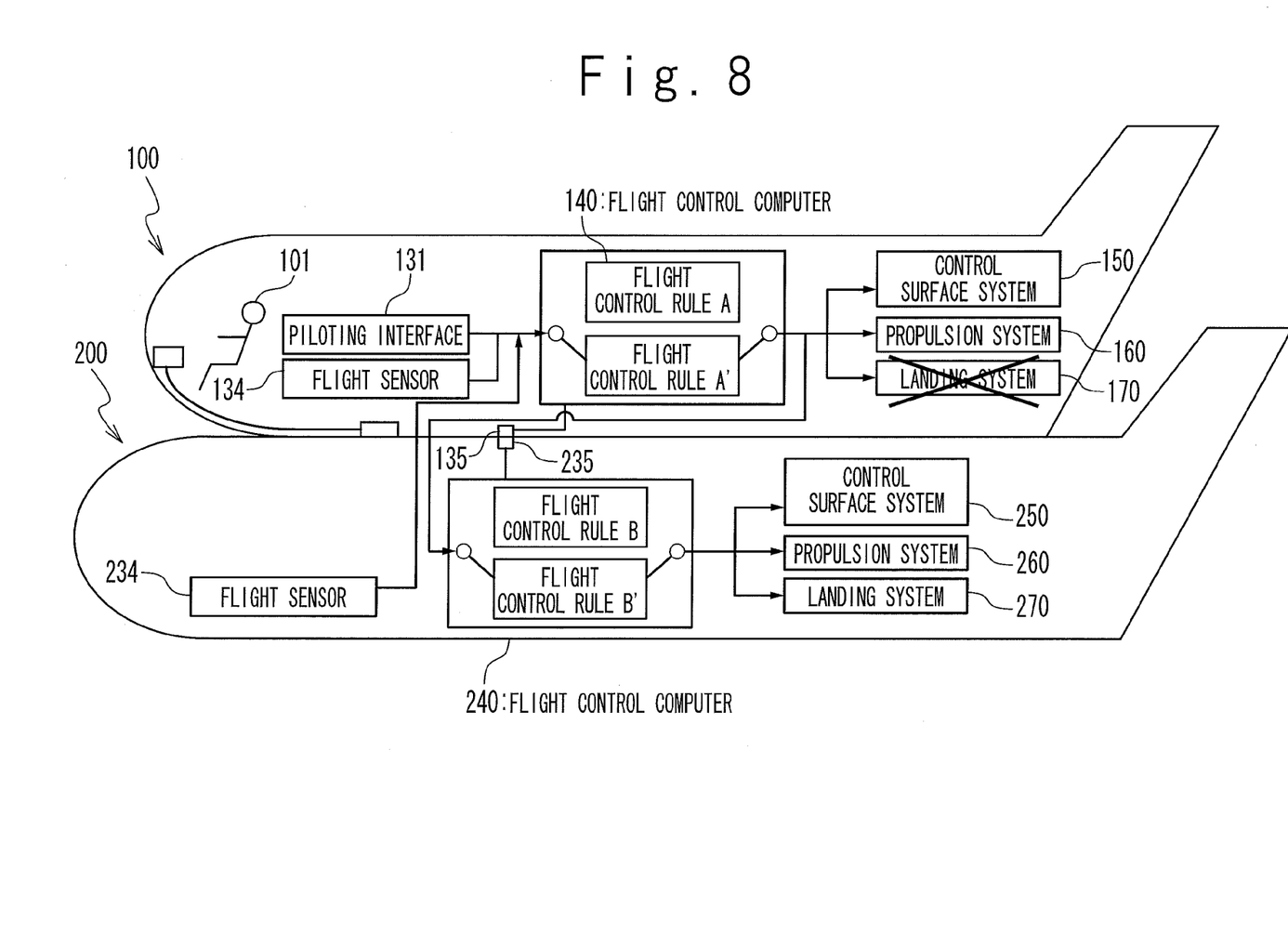
FIG. 8 is a schematic diagram of flight control systems according to a second embodiment of the present invention.

Referring to FIG. 8, an unmanned aircraft system according to a second embodiment of the present invention will be described. The unmanned aircraft system according to the present embodiment is the same as the unmanned aircraft system according to the first embodiment except that the unmanned aircraft joined-case flight state signal is inputted not into the flight control computer 240 but into the flight control computer 140.

A flight control in a case that the manned aircraft 100 and the unmanned aircraft 200 are joined will be described. The piloting interface 131 generates a joined-case pilot command signal in response to an operation by the pilot 101. The flight sensor 134 generates a manned aircraft joined-case flight state signal indicating a flight state of the manned aircraft 100. The flight sensor 234 generates an unmanned aircraft joined-case flight state signal indicating a flight state of the unmanned aircraft 200. The flight control computer 140 generates a manned aircraft joined-case flight control signal based on the joined-case pilot command signal, the manned aircraft joined-case flight state signal, the unmanned aircraft joined-case flight state signal, and the flight control rule A'. The control surface system 150 or the propulsion system 160 operates based on the manned aircraft joined-case flight control signal. The flight control computer 240 generates an unmanned aircraft joined-case flight control signal based on the manned aircraft joined-case flight control signal and the flight control rule B'. The control surface system 250 or the propulsion system 260 operates based on the unmanned aircraft joined-case flight control signal.

Also in the present embodiment, since the unmanned aircraft joined-case flight state signal is used in the flight control of the airframe formed by the joined manned aircraft 100 and unmanned aircraft 200, a controllability of the airframe formed by the joined manned aircraft 100 and unmanned aircraft 200 is excellent. In a case that the unmanned aircraft 200 is much larger than the manned aircraft 100, the flight control computer 140 may output the manned aircraft joined-case flight control signal not based on the manned aircraft joined-case flight state signal. It should be noted that when the joining between the manned aircraft 100 and the unmanned aircraft 200 is not perfectly rigid, it is effective to use both of the unmanned aircraft joined-case flight state signal and the manned aircraft joined-case flight state signal in the flight control of the airframe formed by the joined manned aircraft 100 and unmanned aircraft 200.

In the present embodiment, the manned aircraft joined-case flight control signal is transmitted from the flight control computer 140 to the flight control computer 240 via the surfaces 142 and 242 provided to the joining mechanism 180 and the joining mechanism 280 on one of the nose side and the tail side, in the same manner as that of the first embodiment.

In the present embodiment, the unmanned aircraft joined-case flight state signal is transmitted from the flight sensor 234 to the flight control computer 140 via the surfaces 142 and 242 provided to the joining mechanism 180 and the joining mechanism 280 on one or the other of the nose side and the tail side. The unmanned aircraft joined-case flight state signal is generated as a third electric signal. The signal conversion device 241 converts the third electric signal into a second optical signal. The second optical signal is emitted from the surface 242 and enters the surface 142. The signal conversion device 141 converts the second optical signal into a fourth electric signal. The flight control computer 140 generates the manned aircraft joined-case flight control signal based on the fourth electric signal.

In the above-mentioned respective embodiments, instead of the joining mechanisms 180 and the joining mechanisms 280, other joining mechanisms may be applied to the join between the bottom portion 111 and the roof portion 211. In addition, the manned aircraft joined-case flight control signal may be transmitted from the flight control computer 140 to the flight control computer 240 via radio, and the unmanned aircraft joined-case flight state signal may be transmitted from the flight sensor 234 to the flight control computer 140 via radio.

The above-mentioned embodiments can be mutually combined.

The present invention has been described above with reference to the embodiments; however, the present invention is not limited to the above-mentioned embodiments. Various modifications can be applied to the above-mentioned embodiments.

This application is based upon and claims the benefit of priority from Japanese Patent Application No. 2008-212958, filed on Aug. 21, 2008, the disclosures of which is incorporated herein in its entirely by reference.

The invention claimed is:

1. An unmanned aircraft system comprising:
a manned aircraft and
an unmanned aircraft,
wherein said manned aircraft includes:
a manned aircraft main wing;
a manned aircraft fuselage;
a manned aircraft landing system; and
a manned aircraft joining mechanism provided at a bottom portion of said manned aircraft fuselage,
wherein said unmanned aircraft includes:
an unmanned aircraft main wing;
an unmanned aircraft fuselage;
an unmanned aircraft landing system; and
an unmanned aircraft joining mechanism provided at a roof portion of said unmanned aircraft fuselage,
wherein said manned aircraft joining mechanism and said unmanned aircraft joining mechanism are configured to be detachably joined,
wherein said manned aircraft joining mechanism includes:
a first joining rod;
a second joining rod;
a first actuator;
a second actuator; and
a manned aircraft contact portion,
wherein said unmanned aircraft joining mechanism includes:
a first joining hole portion in which a first joining hole is formed;
a second joining hole portion in which a second joining hole is formed;
a first locking portion;
a second locking portion; and
an unmanned aircraft contact portion,
wherein said first actuator is configured to move said first joining rod in a first direction to insert said first joining rod into said first joining hole,
wherein said second actuator is configured to move said second joining rod in said first direction to insert said second joining rod into said second joining hole,
wherein said first locking portion is configured to lock said first joining rod such that said first joining rod is not pulled out from said first joining hole,
wherein said second locking portion is configured to lock said second joining rod such that said second joining rod is not pulled out from said second joining hole, and
wherein said first actuator and said second actuator are configured to move said first joining rod and said second joining rod in a direction opposite to said first direction to cause said first contact portion to contact said second contact portion.

2. The unmanned aircraft system according to claim 1, wherein said manned aircraft includes a piloting interface operated by a pilot,
said unmanned aircraft includes:
an unmanned aircraft flight sensor;
an unmanned aircraft control surface system; and
an unmanned aircraft propulsion system, and
wherein, when said manned aircraft and unmanned aircraft are joined,
said piloting interface generates an joined-case pilot command signal,
said unmanned aircraft flight sensor generates an unmanned aircraft joined-case flight state signal indicating a flight state of said unmanned aircraft, and
said unmanned aircraft control surface system or said unmanned aircraft propulsion system operate based on said joined-case pilot command signal and said unmanned aircraft joined-case flight state signal.

3. The unmanned aircraft system according to claim 2, wherein said piloting interface generates a landing system control pilot command signal,
wherein, when said manned aircraft and said unmanned aircraft are separated,
said manned aircraft landing system operates based on said landing system control pilot command signal, and
said unmanned aircraft landing system does not operate based on said landing system control pilot command, and
wherein, when said manned aircraft and said unmanned aircraft are joined,
said manned aircraft landing system does not operate based on said landing system control pilot command signal, and
said unmanned aircraft landing system operates based on said landing system control pilot command.

4. The unmanned aircraft system according to claim 2, wherein said manned aircraft includes:
a manned aircraft flight sensor;
a manned aircraft flight control computer;
a manned aircraft control surface system; and
a manned aircraft propulsion system,
wherein said unmanned aircraft includes an unmanned aircraft flight control computer,
wherein, when said manned aircraft and said unmanned aircraft are separated,
said piloting interface generates a separated-case pilot command signal,
said manned aircraft flight sensor generates a manned aircraft separated-case flight state signal indicating a flight state of said manned aircraft,
said manned aircraft flight control computer generates a manned aircraft separated-case flight control signal based on said separated-case pilot command signal, said manned aircraft separated-case flight state signal, and a manned aircraft separated-case flight control rule,
said manned aircraft control surface system or said manned aircraft propulsion system operates based on said manned aircraft separated-case flight control signal, said unmanned aircraft flight sensor generates an unmanned aircraft separated-case flight state signal indicating a flight state of said unmanned aircraft, said unmanned aircraft flight control computer generates an unmanned aircraft separated-case flight control signal based on a flight plan signal, said unmanned aircraft separated-case flight state signal, and an unmanned aircraft separated-case flight control rule, and said unmanned aircraft control surface system or said unmanned aircraft propulsion system operate based on said unmanned aircraft separated-case flight control signal, and wherein, when said manned aircraft and said unmanned aircraft are joined, said manned aircraft flight sensor generates a manned aircraft joined-case flight state signal indicating a flight state of said manned aircraft, said manned aircraft flight control computer generates a manned aircraft joined-case flight control signal based on said joined-case pilot command signal, said manned aircraft joined-case flight state signal, and a manned aircraft joined-case flight control rule, said manned aircraft control surface system or said manned aircraft propulsion system operates based on said manned aircraft joined-case flight control signal, said unmanned aircraft flight control computer generates an unmanned aircraft joined-case flight control signal based on said manned aircraft joined-case flight control signal, said unmanned aircraft joined-case flight control state signal, and an unmanned aircraft joined-case flight control rule, and said unmanned aircraft control surface system or said unmanned aircraft propulsion system operates based on said unmanned aircraft joined-case flight control signal.

5. The unmanned aircraft system according to claim 2, wherein said manned aircraft includes:
   a manned aircraft flight sensor;
   a manned aircraft flight control computer;
   a manned aircraft control surface system; and
   a manned aircraft propulsion system,
   wherein said unmanned aircraft includes an unmanned aircraft flight control computer,
   wherein, when said manned aircraft and said unmanned aircraft are separated,
   said piloting interface generates an separated-case pilot command signal,
   said manned aircraft flight sensor generates a manned aircraft separated-case flight state signal indicating a flight state of said manned aircraft,
   said manned aircraft flight control computer generates a manned aircraft separated-case flight control signal based on said separated-case pilot command signal, said manned aircraft separated-case flight state signal, and a manned aircraft separated-case flight control rule,
   said manned aircraft control surface system or said manned aircraft propulsion system operates based on said manned aircraft separated-case flight control signal,
   said unmanned aircraft flight sensor generates an unmanned aircraft separated-case flight state signal indicating a flight state of said unmanned aircraft,
   said unmanned aircraft flight control computer generates an unmanned aircraft separated-case flight control signal based on a flight plan signal, said unmanned aircraft separated-case flight state signal, and an unmanned aircraft separated-case flight control rule, and
   said unmanned aircraft control surface system or said unmanned aircraft propulsion system operate based on said unmanned aircraft separated-case flight control signal, and
   wherein, when said manned aircraft and said unmanned aircraft are joined,
   said manned aircraft flight sensor generates a manned aircraft joined-case flight state signal indicating a flight state of said manned aircraft,
   said manned aircraft flight control computer generates a manned aircraft joined-case flight control signal based on said joined-case pilot command signal, said manned aircraft joined-case flight state signal, said unmanned aircraft joined-case flight state signal, and a manned aircraft joined-case flight control rule,
   said manned aircraft control surface system or said manned aircraft propulsion system operates based on said manned aircraft joined-case flight control signal,
   said unmanned aircraft flight control computer generates an unmanned aircraft joined-case flight control signal based on said manned aircraft joined-case flight control signal and an unmanned aircraft joined-case flight control rule, and
   said unmanned aircraft control surface system or said unmanned aircraft propulsion system operates based on said unmanned aircraft joined-case flight control signal.

6. The unmanned aircraft system according to claim 4, wherein said manned aircraft includes:
   a manned aircraft signal conversion device; and
   an optical signal emission surface positioned at a tip of said first joining rod,
   wherein said unmanned aircraft includes:
   an unmanned aircraft signal conversion device; and
   an optical signal incident surface positioned at a bottom of said first joining hole,
   wherein said manned aircraft joined-case flight control signal is generated as a first electric signal,
   wherein said manned aircraft signal conversion device converts said first electric signal into an optical signal,
   wherein said optical signal is emitted from said optical signal emission surface and enters said optical signal incident surface,
   wherein said unmanned aircraft signal conversion device converts said optical signal into a second electric signal, and
   wherein said unmanned aircraft flight control computer generates said unmanned manned aircraft joined-case flight control signal based on said second electric signal.

7. The unmanned aircraft system according to claim 1, wherein said first locking portion is configured to mechanically lock said first joining rod, and
   wherein said second locking portion is configured to mechanically lock said second joining rod.

8. The unmanned aircraft system according to claim 1, wherein said first locking portion is configured to electromagnetically lock said first joining rod, and
   wherein said second locking portion is configured to electromagnetically lock said second joining rod.

9. The unmanned aircraft system according to claim 1, wherein said manned aircraft includes:
   a camera provided at said bottom portion; and
   a display device provided in a cockpit, and
   said display device displays images taken by said camera.

10. An unmanned aircraft system comprising:
a manned aircraft and
an unmanned aircraft,
wherein said manned aircraft includes:
a manned aircraft main wing;
a manned aircraft fuselage;
a manned aircraft landing system; and
a manned aircraft joining mechanism provided at a bottom portion of said manned aircraft fuselage,
wherein said unmanned aircraft includes:
an unmanned aircraft main wing;
an unmanned aircraft fuselage;
an unmanned aircraft landing system; and
an unmanned aircraft joining mechanism provided at a roof portion of said unmanned aircraft fuselage,
wherein said manned aircraft joining mechanism and said unmanned aircraft joining mechanism are configured to be detachably joined,
wherein said manned aircraft includes a piloting interface operated by a pilot,
wherein said unmanned aircraft includes:
an unmanned aircraft flight sensor;
an unmanned aircraft control surface system; and
an unmanned aircraft propulsion system, and
wherein, when said manned aircraft and said unmanned aircraft are joined,
said piloting interface generates a joined-case pilot command signal,
said unmanned aircraft flight sensor generates an unmanned aircraft joined-case flight state signal indicating a flight state of said unmanned aircraft, and
said unmanned aircraft control surface system or said unmanned aircraft propulsion system operates based on said joined-case pilot command signal and said unmanned aircraft joined-case flight state signal.

11. An unmanned aircraft system comprising:
a manned aircraft and
an unmanned aircraft,
wherein said manned aircraft includes:
a manned aircraft main wing;
a manned aircraft fuselage;
a manned aircraft landing system; and
a manned aircraft joining mechanism provided at a bottom portion of said manned aircraft fuselage,
wherein said unmanned aircraft includes:
an unmanned aircraft main wing;
an unmanned aircraft fuselage;
an unmanned aircraft landing system; and
an unmanned aircraft joining mechanism provided at a roof portion of said unmanned aircraft fuselage,
wherein said manned aircraft joining mechanism and said unmanned aircraft joining mechanism are configured to be detachably joined,
wherein said manned aircraft includes a piloting interface configured to generate a landing system control pilot command signal based on an operation by a pilot, and
wherein, when said manned aircraft and said unmanned aircraft are joined, said unmanned aircraft landing system operates based on said landing system control pilot command signal.

12. The unmanned aircraft system according to claim 5, wherein said manned aircraft includes:
a manned aircraft signal conversion device; and
an optical signal emission surface positioned at a tip of said first joining rod,
wherein said unmanned aircraft includes:
an unmanned aircraft signal conversion device; and
an optical signal incident surface positioned at a bottom of said first joining hole,
wherein said manned aircraft joined-case flight control signal is generated as a first electric signal,
wherein said manned aircraft signal conversion device converts said first electric signal into an optical signal,
wherein said optical signal is emitted from said optical signal emission surface and enters said optical signal incident surface,
wherein said unmanned aircraft signal conversion device converts said optical signal into a second electric signal, and
wherein said unmanned aircraft flight control computer generates said unmanned manned aircraft joined-case flight control signal based on said second electric signal.

* * * * *